United States Patent
Fujii et al.

(10) Patent No.: US 9,310,925 B2
(45) Date of Patent: Apr. 12, 2016

(54) APPARATUS AND METHOD FOR CONTROLLING AN INTERFACE BASED ON BENDING

(71) Applicant: SONY CORPORATION, Tokyo (JP)

(72) Inventors: Hiromitsu Fujii, Tokyo (JP); Kentaro Ida, Tokyo (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 13/969,261

(22) Filed: Aug. 16, 2013

(65) Prior Publication Data

US 2015/0049042 A1 Feb. 19, 2015

(51) Int. Cl.
| | |
|---|---|
| G06F 3/041 | (2006.01) |
| G06F 3/044 | (2006.01) |
| G06F 1/16 | (2006.01) |
| G06F 3/0488 | (2013.01) |
| H04M 1/02 | (2006.01) |

(52) U.S. Cl.
CPC ............ *G06F 3/0416* (2013.01); *G06F 1/1652* (2013.01); *G06F 3/044* (2013.01); *G06F 3/0488* (2013.01); *H04M 1/0268* (2013.01); *G06F 2203/04102* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 8,654,087 B2 * | 2/2014 | Kang et al. | 345/173 |
| 2009/0066663 A1 | 3/2009 | Chang et al. | |
| 2010/0164888 A1 * | 7/2010 | Okumura et al. | 345/173 |
| 2012/0139834 A1 | 6/2012 | Han et al. | |
| 2013/0170157 A1 | 7/2013 | Park | |
| 2013/0265260 A1 | 10/2013 | Seo et al. | |

FOREIGN PATENT DOCUMENTS

| | | |
|---|---|---|
| EP | 2 648 065 A2 | 10/2013 |
| JP | 2012-137889 A | 7/2012 |

OTHER PUBLICATIONS

Extended European Search Report issued Feb. 9, 2015 in Patent Application No. 14178155.9.
U.S. Appl. No. 13/910,741, filed Jun. 5, 2013, Fujii, et al.
U.S. Appl. No. 13/870,454, filed Apr. 25, 2013, Ida, et al.

* cited by examiner

*Primary Examiner* — Nicholas Lee
(74) *Attorney, Agent, or Firm* — Oblon, McClelland, Maier & Neustadt, L.L.P.

(57) ABSTRACT

An apparatus includes a touch panel display having one or more sensors for detecting an input operation on the touch panel display, the input operation corresponding to a bending operation whereby the touch panel display is bent and/or a touch operation whereby an instruction object contacts a surface of the touch panel display. The apparatus includes circuitry configured to detect, when the bending operation is detected, a presence of a stripe pattern based on sensor values output when the bending operation is detected. The circuitry determines, when the stripe pattern is detected, one or more features of the detected stripe pattern, and based on the one or more features of the detected stripe pattern, determines whether the detected stripe pattern matches a predetermined pattern stored in a memory. The circuitry executes a predetermined function or process corresponding to the predetermined pattern when the detected stripe pattern matches the predetermined pattern.

20 Claims, 10 Drawing Sheets

APPARATUS AND METHOD FOR CONTROLLING AN INTERFACE BASED ON BENDING

BACKGROUND

1. Technical Field

The present disclosure relates to detecting aspects of bending a mobile device, and controlling the mobile device based on the detection.

2. Description of Related Art

In recent years, mobile devices such as smart phones and tablet computers utilize touch panels as operational input interfaces. For example, a mobile device may include a touch panel that detects when an instruction object such as a user's finger is within a predetermined proximity of an operation surface of the touch panel. The touch panel may also output a coordinate corresponding to the point at which the instruction object was detected. Sensors on a touch panel may detect when the instruction object comes in physical contact with the operation surface, or alternatively may utilize sensors for detecting when the instruction object comes within a range of detection for the particular sensor. Additionally, the sensors on a touch panel display may distinguish when a particular type of input operation is performed, such as a "swipe" or "tap" operation.

Exemplary touch panel technologies utilized in mobile devices include capacitive and resistive type touch panel displays. Capacitive type touch panel displays may generate uniform electrostatic fields with which to detect instruction objects during input operations. An electrostatic capacitive type touch panel may include several transparent electrodes arranged on the operation surface of the touch panel display in a matrix pattern. When an instruction object contacts or approaches the operation surface of the electrostatic capacitive touch panel, the electrostatic capacitance value of a transparent electrode sensor in the matrix pattern changes.

SUMMARY

While various processing may be performed in previous devices using a touch panel, more advanced operations are desired for improving device operation and user friendliness.

In one embodiment of the present disclosure, a mobile device includes a touch panel display. The touch panel display may include one or more sensors for detecting an input operation on the touch panel display. The input operation may correspond to one or more of a bending operation whereby the touch panel display is bent and a touch operation whereby an instruction object contacts a surface of the touch panel display. The mobile device may include circuitry configured to detect, in response to detecting the bending operation, a presence of a stripe pattern based on sensor values output by the one or more sensors when the bending operation is detected. The circuitry may determine, when the stripe pattern is detected, one or more features of the stripe pattern. The circuitry may determine, based on the one or more features of the detected stripe pattern, whether the one or more features of the detected stripe pattern match one or more features of a predetermined pattern stored in a memory. The circuitry may execute a predetermined function or process corresponding to the predetermined pattern when the one or more features of the detected stripe pattern match the one or more features of the predetermined pattern.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
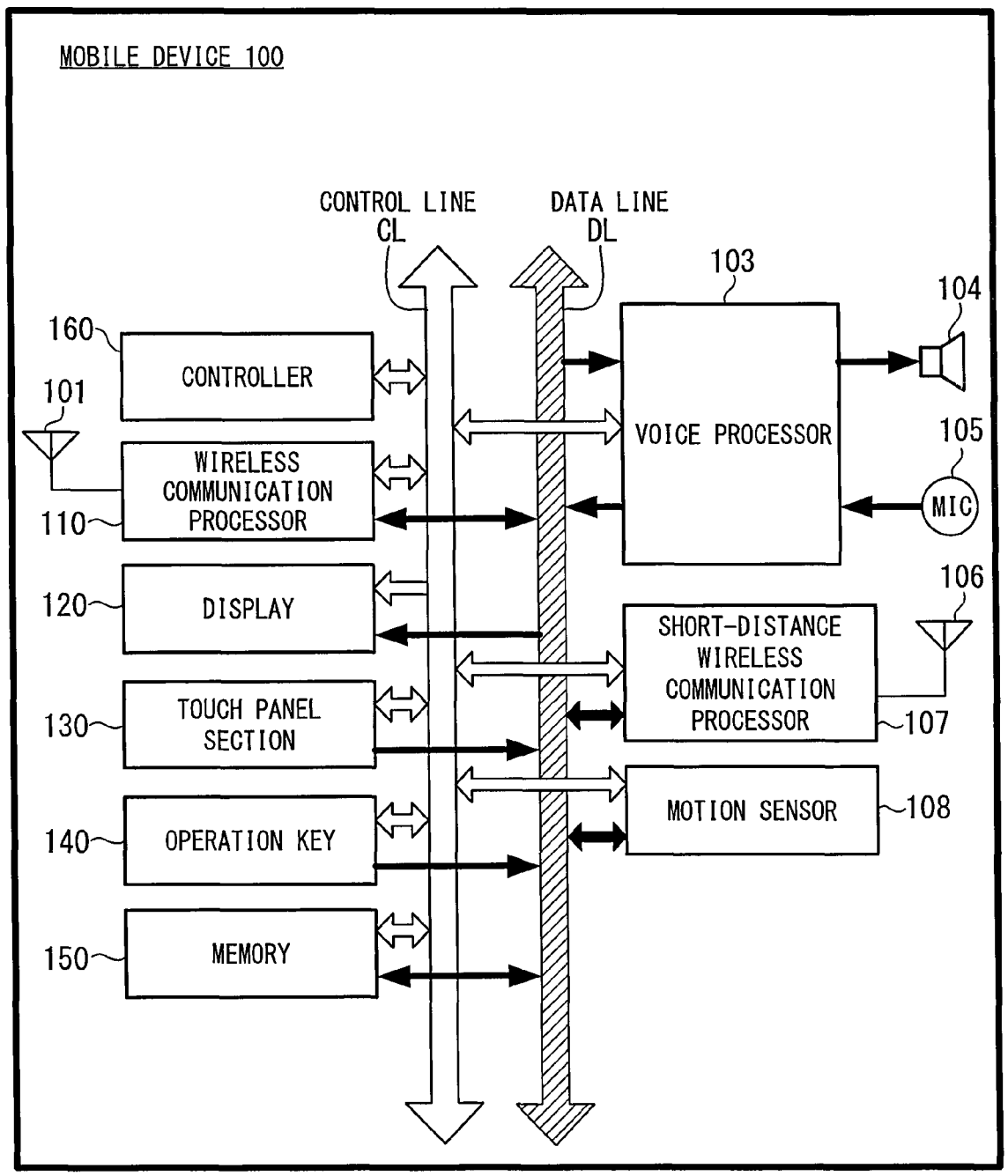
FIG. 1 illustrates an exemplary mobile device structural configuration according to one aspect of the present disclosure.

Referring now to the drawings, wherein like reference numerals designate identical or corresponding parts throughout the several views.

FIG. 1 illustrates a block diagram for an exemplary mobile device 100. The exemplary mobile device 100 of FIG. 1 includes a controller 160, a wireless communication processor 110 connected to an antenna 101, a speaker 104, a microphone 105, and a voice processor 103.

The controller 160 may include one or more Central Processing Units (CPUs), and may control each element in the mobile device 100 to perform features related to communication control, audio signal processing, control for the audio signal processing, image processing and control, and other kinds processing. The controller 160 may perform these features by executing instructions stored in a memory 150 or a non-transitory computer readable medium having instructions stored therein. Further, the controller 160 may perform predetermined functions and/or processing corresponding to a detected touch operation and/or bending operation on touch panel section 130, as described in further detail in later paragraphs.

Control and data signals may be respectively transmitted in the mobile device 100 via the control line CL and the data line DL. For example, the controller 160 may transmit a control command to the wireless communication processor 110 (or another element of the mobile device 100) through the control line CL. Similarly, voice and/or content data may be transmitted to the wireless communication processor 110 from the voice processor 103 via the data line DL.

The antenna 101 transmits/receives electromagnetic wave signals, e.g., between base stations for performing radio-based communication, such as the various forms of cellular telephone communication.

The wireless communication processor 110 controls communications performed between the mobile device 100 and other external devices via the antenna 101. For example, the wireless communication processor 110 may control communication between the base stations for cellular phone communication. Additionally, when the mobile device 100 performs data exchange via an external network (e.g., the Internet), the wireless communication processor 110 controls the process of transmission and/or reception of the data signals under the control of the controller 160. For example, data received by the wireless communication processor 110 may be stored in the memory 150, and the controller 160 may perform display processing such that the stored data (e.g., an image file) may be displayed on display 120.

The speaker 104 emits an audio signal corresponding to audio data supplied from the voice processor 103.

The microphone 105 detects surrounding audio, and converts the detected audio into an audio signal. The audio signal may then be output to the voice processor 103 for further processing.

The voice processor 103 demodulates and/or decodes the audio data read from the memory 150, or audio data received by the wireless communication processor 110 and/or a short-distance wireless communication processor 107. Additionally, the voice processor 103 may decode audio signals obtained from the microphone 105. For example, voice data for a telephone call may be supplied to the voice processor 103 from the wireless communication processor 110 via the data line DL. The voice processor 103 may perform a demodulation process on the supplied voice data to generate an analog voice signal. The analog voice signal may then be supplied to the speaker 104, where it is output as external sound.

It should be appreciated that when the mobile device 100 is not equipped with a voice call function, as is sometimes the case with an e-reader or digital music player, one or more of the voice processor 103, the speaker 104, and the microphone 105 may be omitted; however, the skilled artisan will appreciate that these elements may be utilized in other aspects of mobile device control and signal processing (e.g., voice control, content output, etc.) and therefore, the omission of such elements may not be desirable in some cases.

The display 120 may be a Liquid Crystal Display (LCD), or another known display screen technology. In addition to displaying images, the display 120 may display operational inputs, such as numbers or icons, which may be used for control of the mobile device 100. The display 120 may additionally display a graphical user interface with which a user may control aspects of the mobile device 100 (e.g., via touch operations).

Touch panel section 130 may include one or more sensors for detecting an input operation on the touch panel 8. The input operation may, e.g., correspond to a touch operation in which an instruction object (e.g., a finger or stylus) contacts a surface of the touch panel section 130. Moreover, the input operation may, e.g., correspond to a bending operation in which the one or more sensors detect a temporary change in the physical structure of the touch panel section 130 (e.g., by bending the mobile device 100). In certain aspects of the present disclosure, the touch panel section 130 may be disposed adjacent to the display 120 (e.g., laminated), or may be formed integrally with the display 120. For simplicity, the present disclosure assumes the touch panel section 130 is a capacitance-type touch panel technology; however, it should be appreciated that aspects of the present disclosure may easily be applied to other touch panel types (e.g., resistance type touch panels) with alternate structures.

In certain aspects of the present disclosure, the touch panel section 130 may include transparent electrode touch sensors arranged in the X-Y direction on the surface of transparent sensor glass. Sensor data such as a coordinate position or magnitude value corresponding to the input operation may be transmitted to the controller 160, which may perform subsequent processing based on the received sensor data. Sensor data and other signals may be transmitted by the touch panel section 130, e.g., in response to a detection of an input operation, in response to a query from another element/device, based on timed data exchange, etc. The sensor data may be represented as a sensor output distribution pattern, which will be discussed in later paragraphs for numerous types of input operations. For the purposes of the present disclosure, a sensor output distribution pattern corresponds to a range of sensor outputs distributed on the touch panel section 130, wherein the sensor outputs may include a magnitude value (e.g., a detected electrostatic capacitance) and/or a corresponding coordinate of the detected magnitude value.

A touch panel driver may be included in the touch panel section 130 for control processing related to the touch panel section 130, such as scanning control. For example, the touch panel driver may scan each sensor in an electrostatic capacitance transparent electrode pattern in the X-direction and Y-direction and detect the electrostatic capacitance value of each sensor to determine when a touch and/or bending operation is performed. The touch panel driver may output a coordinate and corresponding electrostatic capacitance value for each sensor. The touch panel driver may also output a sensor identifier that may be mapped to a coordinate on the touch panel 130. Additionally, the touch panel driver and touch panel section 130 may detect when an instruction object, such as a finger, is within a predetermined distance from an operation surface of the touch panel section 130. That is, the instruction object does not necessarily need to directly contact the operation surface of the touch panel section 130 for touch sensors to detect the presence of the instruction object and perform processing described herein.

The coordinate position which the touch panel section 130 detects may not necessarily be one point. That is, when the touch panel section 130 is concurrently touched and/or bent, the one or more sensors of the touch panel section 130 may detect a wide range of sensor outputs, and the controller 160 may perform processing based on all of the detected range, or a portion thereof.

The display 120 and the touch panel section 130 may be surrounded by a frame portion of a protective case on the mobile device 100. The mobile device 100 case may additionally enclose the other internal elements of the mobile device 100. As a non-limiting example, the display 120 and touch panel section 130 may substantially form a front operational surface of the mobile device 100, while the remaining external surface of the mobile device 100 may be formed by the case. The protective case is preferably of adequate material strength to protect the mobile device 100, while still allowing some flexibility such that the controller 160 may detect when a bending operation occurs. It should be noted that even very small changes in the mobile device 100 structure that are not perceived by the user performing a bending operation can still be detected by the touch panel section 130 sensors, which can then register the bending operation occurrence.

The operation key 140 may include one or more buttons or similar external control elements, which may generate an operation signal based on a detected input by the user. These operation signals may be supplied to the controller 160 for performing related processing and control. In certain aspects of the present disclosure, the processing and/or functions associated with external buttons and the like may be performed by the controller 160 in response to a touch and/or bending operation rather than manipulating the button, key, etc. In this way, external buttons on the mobile device 100 may be eliminated in lieu of performing inputs via bending and/or touch operations, thereby improving water tightness and design appeal.

The memory 150 may include, e.g., Read Only Memory (ROM), Random Access Memory (RAM), or a memory array comprised of a combination of volatile and non-volatile memory units. The memory 150 may be utilized as working memory by the controller 160 while executing the processing and algorithms of the present disclosure. Additionally, the memory 150 may be used for long-term storage, e.g., of images and information related thereto. Moreover, the memory 150 may store executable instructions (i.e., a computer program) that may be executed by the controller 160. The controller 160 may control the memory 150 such that unwanted data stored in the memory 150 is erased. The flowcharts included in the present disclosure may represent exemplary algorithms included in the instructions stored in the memory 150 for execution by the controller 160.

Additionally, the memory 150 may store information relating to predetermined features of a touch operation and/or a bending operation (e.g., sensor output distribution patterns, sensor magnitude values, input coordinates, information relating to a location on the touch panel at which an input operation is performed, information relating to combinations of input operations, information relating to a combination of one or more input operations and a movement of the mobile device 100, spacing intervals between stripe patterns, temporal changes in sensor output distribution/stripe patterns and/or sensor value magnitudes and/or coordinates, etc.). As discussed in later paragraphs, in certain aspects of the present disclosure, a predetermined function or process may be executed in response to detecting a match between one or more features of one or more detected input operations, such as a touch and/or bending operation, and one or more features of one or more predetermined sensor output distribution patterns stored in the memory 150.

Antenna 106 may transmit/receive electromagnetic wave signals to/from other external apparatuses, and the short-distance wireless communication processor 107 may control the wireless communication performed between the other external apparatuses and/or access points. Bluetooth, Wi-Fi, and near-field communication (NFC) are non-limiting examples of wireless communication protocols that may be used for inter-device communication by the short-distance wireless communication processor 107. The short-distance wireless communication processor 107 may additional function as a communication interface for transmitting signals (e.g., control signals) to other external devices. In this way, the mobile device 100 may control functions performed by the other external devices.

A motion sensor 108 may be included in the mobile device 100. The motion sensor 108 may include one or more sensors for detecting a movement of the mobile device 100, and for outputting a motion signal to the controller 160 in response to the detected movement. In certain aspects of the present disclosure, the motion signal may include outputs from one or more of an accelerometer sensor, a geomagnetic sensor, a gyroscope, or other motion-based sensor included in the motion sensor 108.

Figure 2:
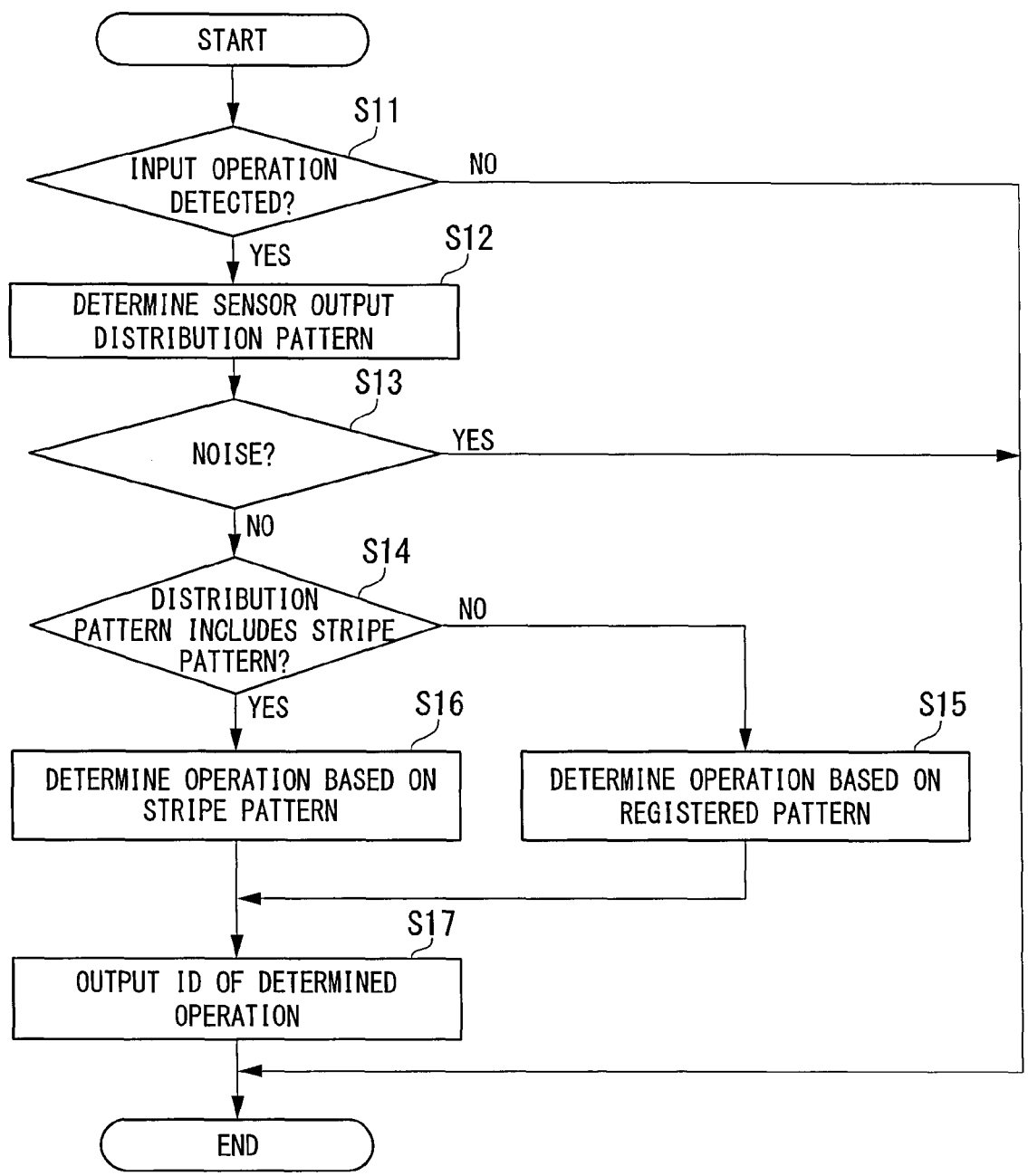
FIG. 2 illustrates an exemplary flowchart for executing a predetermined function or process based on a detected input operation according to one aspect of the present disclosure.

Next, FIG. 2 illustrates a non-limiting example of a flow chart for performing a predetermined process for a function based on detected features of an input operation. At step S11, the controller 160 determines if an input operation has been detected on the touch panel section 130. In certain aspects of the present disclosure, the controller 160 may determines if an input operation has been performed when all coordinate positions of the sensors included in the touch panel section 130 output a capacitance magnitude value greater than zero. In other aspects of the present disclosure, the controller 160 determines that a touch operation has been performed on the touch panel section 130 when the sensor output capacitance values are above a predetermined threshold.

The processing shown in FIG. 2 ends when a touch operation is not detected at step S11. Otherwise, if an input operation is detected at step S11, the controller 160 at step S12 determines a sensor output distribution pattern corresponding to the detected input operation. At step S13, the controller 160 determines whether the sensor output distribution pattern determined at step S12 is the result of background noise detected by the touch panel section 130 sensor(s). Features of sensor output distribution patterns that are indicative of background noise may, in some embodiments, be stored in the memory 150 in advance and may be used for a comparison performed at step S13 whereby one or more features of the detected sensor output distribution pattern is compared with one or more features of the stored background noise distribution pattern.

If the sensor output distribution pattern detected at step S12 is determined at step S13 to be background noise, the processing ends. Otherwise, the controller 160 at step S14 determines whether the sensor output distribution pattern determined at step S12 includes a stripe pattern. Exemplary features of stripe patterns that are, for example, detected during bending operations will be discussed in later paragraphs.

If a stripe pattern is not determined to be included in the sensor output distribution pattern at step S14, the controller 160 at step S15 compares a preregistered distribution pattern stored in the memory 150 with the sensor output distribution pattern determined at step S12. In certain aspects of the present disclosure, the controller 160 performs the comparison of step S15 based on one or more features of a plurality of predetermined patterns stored in the memory 150 until a match is determined. If a match is determined at step S15, the controller 160 determines an operation corresponding to the matched pattern stored in the memory 150. For example, when the sensor output distribution pattern indicates instruction object movement in a substantially linear pattern detected at a specific location of the touch panel display, the controller 160 may determine that a "swipe" operation has been performed.

When a corresponding function or process is determined at step S15, the controller at step S17 generates an identification (ID) code for performing the operation determined at step S15. In certain aspects of the present disclosure, the controller 160 may execute a program in which the corresponding function or process linked to the identification code is executed based on receipt of the identification code.

Referring back to step S14, when the controller at step S14 determines that the sensor output distribution pattern of step S12 includes a stripe pattern, the controller 160 at step S16 analyzes the stripe pattern to detect one or more features of the stripe pattern. In certain aspects of the present disclosure, the controller 160 may determine a changing state of the stripe pattern at step S16 (e.g., temporal changes in touch panel sensor output). In other aspects of the present disclosure, the controller 160 may determine a relative location on the touch panel display 130 at which the stripe pattern is located. The one or more features of the stripe pattern determined at step S16 may then be compared to one or more features of preregistered stripe patterns stored in the memory 150. When one or more features of the detected stripe pattern are matched with features of the preregistered stripe pattern stored in the memory 150, a corresponding function to the preregistered stripe pattern is determined by the controller 160, and the controller 160 at step S17 generates an identification code for performing the operation determined at step S16. The controller 160 may then execute the corresponding function or process determined at step S16, based on the generated identification code. The processing illustrated in the exemplary flowchart of FIG. 2 may then be repeated for subsequent input operations.

Figure 3:
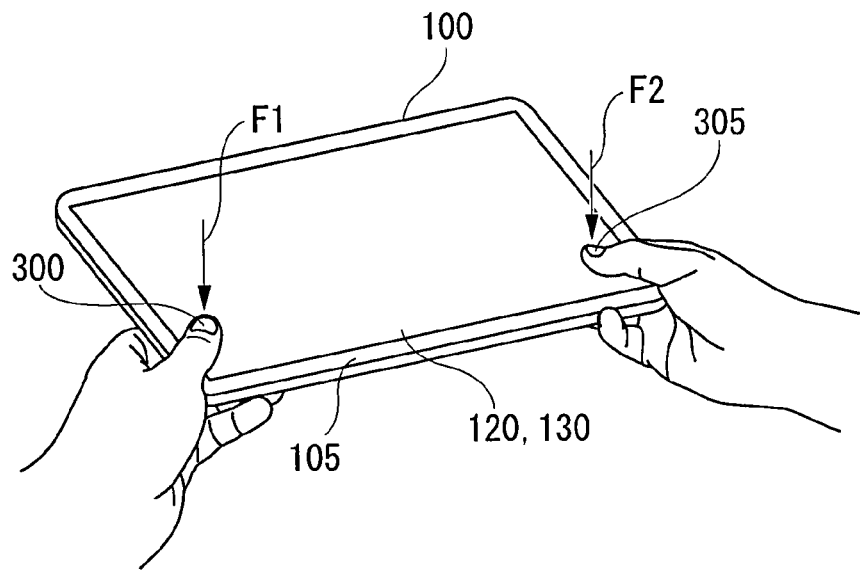
FIG. 3 illustrates an exemplary touch operation performed on a mobile device according to one aspect of the present disclosure.

Next, FIG. 3 illustrates a non-limiting example of performing a touch operation on the mobile device 100. The exemplary touch operation in FIG. 3 is shown with a user holding the mobile device with two hands at opposing ends of the mobile device 100. The mobile device 100 in FIG. 3 includes a protective case 105. For the purposes of this example, the mobile device 100 shown in FIG. 3 may be a tablet-type mobile device, such as an e-reader. In this case, the mobile device 100 of FIG. 3 may be a tablet with a diagonal length of approximately 5 to 10 inches. Moreover, the case 105 which houses the internal elements of the mobile device 100 and surrounds the display 120 may have an overall thickness of approximately 1 cm.

In the example of FIG. 3, the mobile device 100 is in a state in which a user is holding the mobile device 100 with his or her left thumb 300 on a left side of the touch panel section 130 and the user's right thumb 305 on a right side of the touch panel section 130. The remaining fingers of the user's hands in the example of FIG. 3 are shown on a bottom surface of the mobile device 100. When the user's left thumb 300 pushes the surface of the touch panel section 130, a force F1 is generated in the area in which the touch operation is performed at the left end of the touch panel section 130. Similarly, when the user's right thumb 305 presses a surface of the touch panel section 130, a force F2 is generated at an area corresponding to the touch operation on the right side of the touch panel section 130. Based on the applied forces F1 and F2, the touch panel section 130 may output sensor output magnitude values for a range of sensor coordinates corresponding to the touch operation. The sensor output values may be used to form a sensor output distribution pattern, examples of which will be illustrated in later figures.

Figure 4:
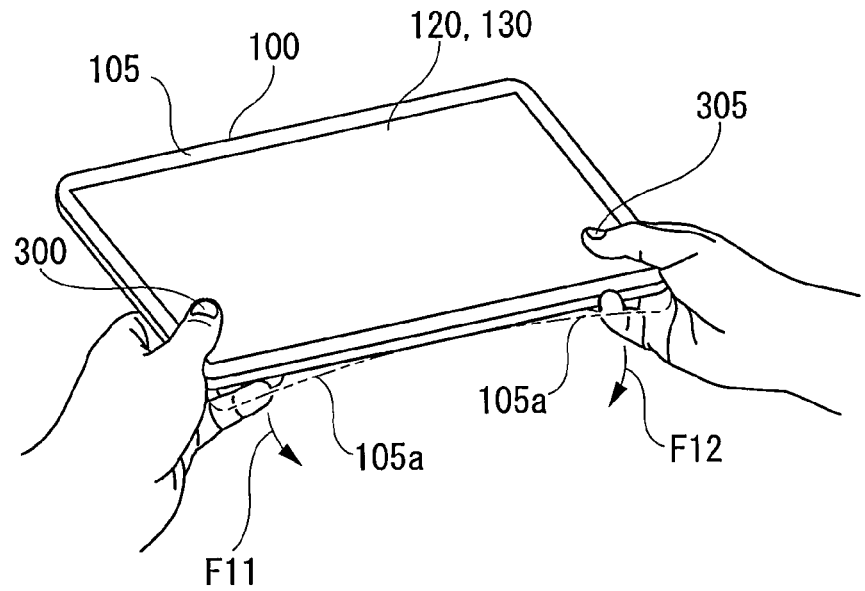
FIG. 4 illustrates an exemplary bending operation performed on a mobile device according to one aspect of the present disclosure.

Next, FIG. 4 illustrates an example similar to that of FIG. 3 in which the user is holding the mobile device 100 with both hands at a left end and a right end of the touch panel section 130. As in the example of FIG. 3, the example of FIG. 4 illustrates the user's left thumb 300 contacting a leftward surface of the touch panel section 130 and the user's right thumb 305 contacting a rightward surface of the touch panel section 130. Again, the user's remaining fingers hold the mobile device 100 at an underside of the mobile device 100. In this example, forces F11 and F12 are respectively applied at the left edge and the right edge of the mobile device 100 such that the mobile device 100 is bent to a bow shape. For illustration purposes, the bending of the mobile device 100 in FIG. 4 is illustrated by the dotted line shown representing the bent case 105a following the bending operation. The bending operation illustrated in FIG. 4 is assumed to be performed in such a manner that the user's thumbs press downward on the operation surface of the touch panel section 130 while simultaneously pushing the left and right edges of the mobile device 100 downward such that the mobile device 100 is bent at a substantially center portion. Since the case 105 of the mobile device 100 is preferably formed of a hard resin or metallic material, the change in shape of the mobile device 100 resulting from the bending operation of FIG. 4 will typically not be visually recognized. However, even relatively small bending forces may be detected by the sensors included in the touch panel section 130.

In certain aspects of the present disclosure, the touch panel section 130 sensors may generate a stripe distribution pattern as a result of the bending operation.

It should be appreciated that the bending operation illustrated in FIG. 4 is merely for illustration purposes, and the skilled artisan will easily appreciate that other similar bending operations may be performed at other areas of the mobile device 100 such that different sensor output distribution patterns may be output by the sensors included in the touch panel section 130. Moreover, the example of FIG. 4 illustrates a case in which the user is directly contacting the operation surface of the touch panel section 130 with his or her left and right thumbs. However, as will be shown in later examples, it is not necessary for the operation surface of the touch panel section to be contacted during a bending operation, nor is it necessary for the user to hold the mobile device 100 with both hands when performing a bending operation. For example, the user may hold the mobile device 100 with one hand by contacting only the case 105, in which case the weight of the mobile device 100 may generate a sensor output distribution pattern (e.g., a stripe pattern) as the mobile device 100 is bent downward by its own weight.

Figure 5A:
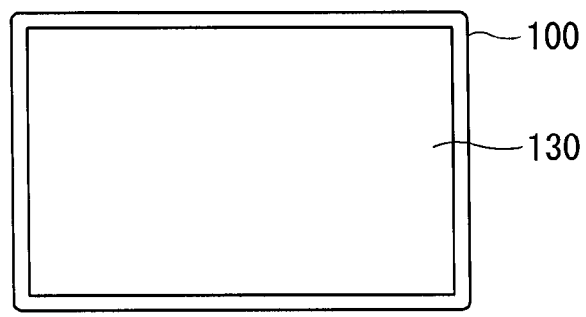
FIG. 5A illustrates an exemplary sensor output distribution pattern when a mobile device touch panel display is untouched according to one aspect of the present disclosure.
Figure 5B:
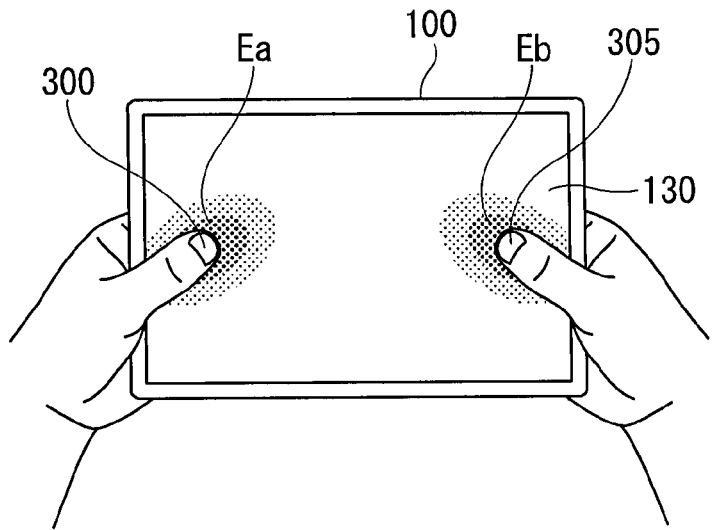
FIG. 5B illustrates an exemplary sensor output distribution pattern when a touch operation is performed according to one aspect of the present disclosure.
Figure 5C:
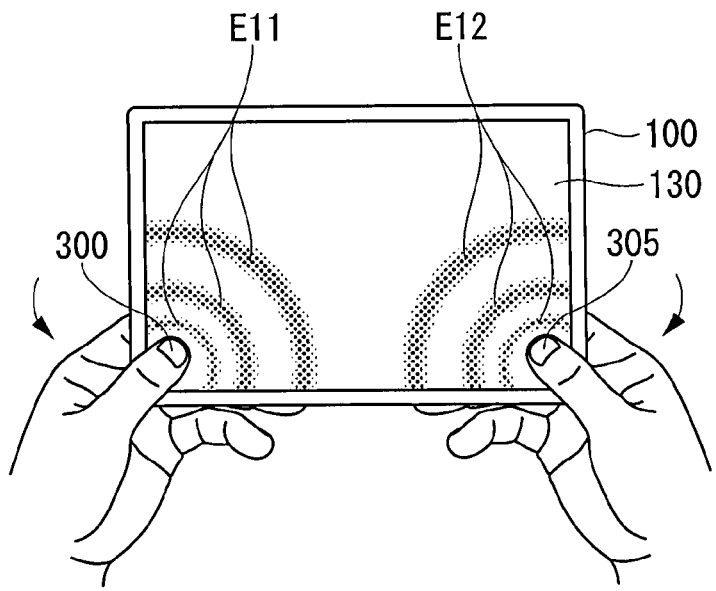
FIG. 5C illustrates an exemplary sensor output distribution pattern when a bending operation is performed according to one aspect of the present disclosure.

Next, FIGS. 5A through 5C illustrate exemplary sensor output distribution patterns resultant from various input operations performed on the touch panel section 130. Referring first to FIG. 5A, FIG. 5A illustrates a case in which the mobile device 100 is in a resting state whereby the operation surface of the touch panel section is not being contacted, e.g., by a user's hands. As shown in FIG. 5A, the sensors included in the touch panel section 130 do not detect an input operation being performed and therefore, no sensor output distribution pattern is generated.

Next, FIG. 5B illustrates a case in which a user is pressing a left side of the touch panel section 130 with his or her left thumb 300, and pressing a right side of the touch panel section 130 with his or her right thumb 305. As a result of the touch operations shown in the example of FIG. 5B, the sensors included in the touch panel section 130 may generate a sensor output distribution pattern corresponding to elliptical range Ea shown at the left side of the touch panel section 130, and an elliptical range Eb shown at the right side of the touch panel section 130. The shape and shading of the exemplary ranges Eb and Eb shown in the example of FIG. 5B may, in certain aspects of the present disclosure, represent changes in sensor output (e.g., electrostatic capacitance) magnitude and/or coordinate values resulting from the location and pressure applied during the touch operation.

FIG. 5C illustrates an exemplary stripe pattern resulting from a bending operation performed on the mobile device 100. In this example, the user's left thumb 300 contacts a bottom left corner of the touch panel section 130 and the user's right thumb 305 contacts a bottom right corner of the touch panel section 130 while a bending force is applied such that the bottom left and right corners are bent downward. As a result of the bending operation, the sensors included in the touch panel section 130 may generate sensor output distribution patterns illustrated in this example as stripe patterns E11 and E12. The stripe patterns E11 and E12 in this example are illustrated by showing electrostatic capacitance changes spreading radially from a center position corresponding to the position where the thumbs 300 and 305 are respectively contacting the touch panel section 130. In certain aspects of the present disclosure, the position of a stripe included in a stripe pattern spreads like a wave from the center position as the electrostatic capacitance values change, and the position of the stripe is always changing. The changing electrostatic capacitance value becomes small as it radiates outward from the center position where the thumb contacts the touch panel section 130. Additionally, a stripe spacing interval also becomes gradually larger as it radiates outward from the center position at which the thumbs 300 and 305 contact the operation surface of the touch panel section 130. In this example, stripes included in the stripe pattern E11 and E12 are not detected at the approximate center of the touch panel section 130; however, this exemplary stripe pattern is not limiting, and the magnitude, shape, size, etc. of the stripe pattern may be dependent on the nature of the bending operation, as well as the materials with which the mobile device 100 is constructed.

As will be discussed in greater detail in later examples, when the touch panel section 130 generates the stripe pattern illustrated in the example of FIG. 5C, the controller 160 may perform a predetermined function or process allocated to the detected stripe pattern and/or changes in the detected stripe pattern. For example, the controller 160 may perform a function in which the displayed page on the mobile device 100 is changed as a result of detecting the bending operation illustrated in FIG. 5C. Moreover, the memory 150 may store a plurality of features for a plurality of stripe patterns and/or changes in stripe patterns such that a change in the detected stripe pattern performed on the mobile device 100 may be matched with one or more of the pattern features stored in the memory 150, which causes the controller 160 to perform another predetermined process or function based on the detected changes in stripe patterns resultant from other bending operations.

Further, the temporal changes in sensor output distribution patterns may also be utilized by the controller 160 when determined a predetermined function and/or process to perform in response to detecting an input operation. For example, the controller 160 may perform a predetermined function and/or process when a detected temporal change and/or rate of change in magnitude and/or coordinate values included in a detected distribution pattern match predetermined values stored in the memory 150.

Figure 6A:
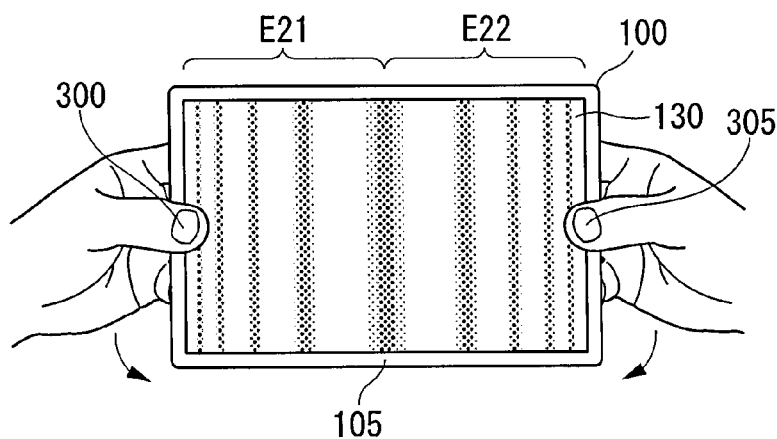
FIGS. 6A-6C illustrate exemplary sensor output stripe patterns resultant from bending operations according to one aspect of the present disclosure.
Figure 6B:
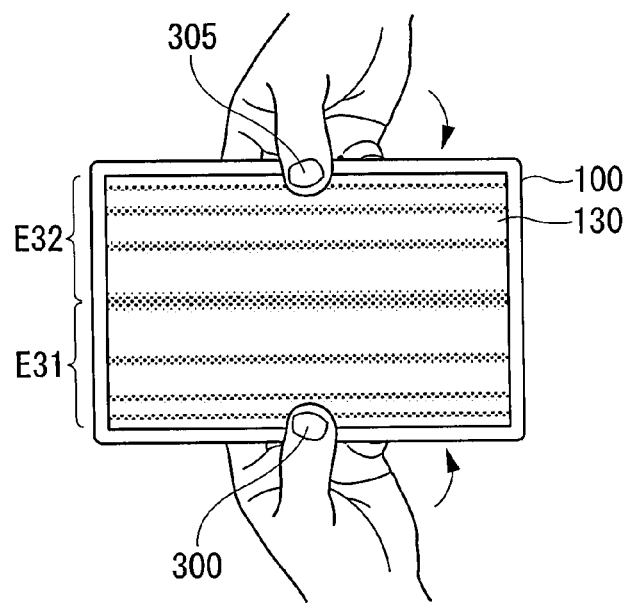
Figure 6C:
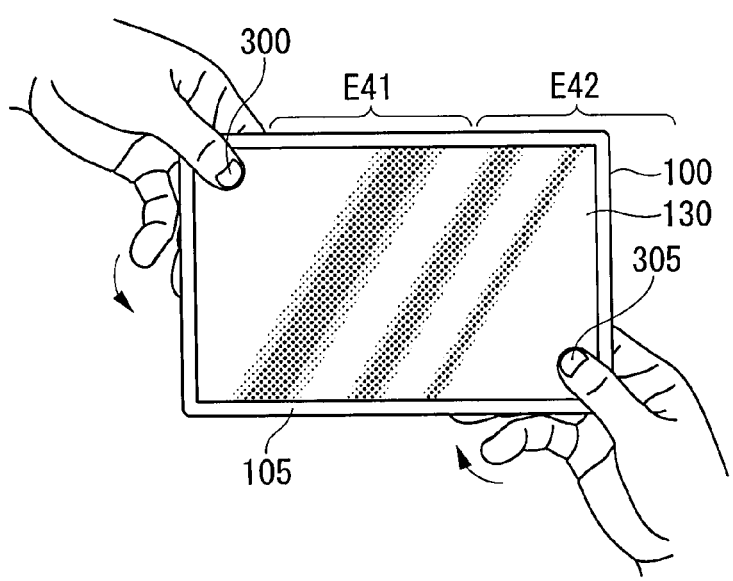

Next, FIGS. 6A through 6C illustrate exemplary stripe patterns resultant from a bending operation performed with two hands. Referring first to FIG. 6A, a user is shown holding the mobile device 100 case long-ways using his or her thumbs 300 and 305. In this example, the user's thumbs are approximately centered on the left and right sides of the mobile device 100, and a downward force is applied to the mobile device 100 using the user's thumbs and remaining fingers contacting the underside of the mobile device 100 such that the center of the mobile device 100 is bent upward. As a result of the applied force, a vertical stripe pattern E21 radiates rightward from the left edge of the mobile device 100 where the thumb 300 is located, and a vertical stripe pattern E22 radiates leftward from the right edge of the mobile device 100 where the right thumb 305 is located.

Next, FIG. 6B illustrates an example in which the user is holding the mobile device 100 with both hands at the longer upper and lower edges of the case 105. In this example, the user's right thumb 305 is holding an upper edge of the case 105 at an approximately center position, and the user's left thumb 300 is holding the lower edge of the case 105 at an opposing center position. Similar to the example of FIG. 6A, a downward force is applied at the opposing upper and lower edges of the mobile device 100 such that the center of the mobile device 100 is bent upward creating a bow shape centered at the longer length of the touch panel section 130. As a result of the force applied to the mobile device 100 in this example, a horizontal pattern E31 radiates upward from the lower edge of the touch panel section 130, and a horizontal stripe pattern E32 radiates downward from an upper edge of the touch panel section 130.

Next, FIG. 6C illustrates an example in which the user is holding the mobile device 100 with both hands at opposing upper and lower corners. In particular, the user's left thumb 300 is holding an upper left corner of the case 105, and the user's right thumb 305 is holding a lower right corner of the mobile device 100. While holding the respective corners of the mobile device 100, a downward force is applied to the opposing corners such that a diagonal of the mobile device 100 is bent upward. As a result of the force applied in this example, a diagonal stripe pattern E41 radiates diagonally downward from a position corresponding to the user's thumb 300, and a second diagonal stripe pattern E42 radiates in an opposing direction from the user's thumb 305.

Thus, as illustrated in the examples of FIGS. 6A through 6C, when a bending force is applied to the touch panel section 130, different stripe patterns may be generated according to the position in which the user is holding the mobile device 100 and/or applying the bending force. Therefore, the controller 160 may distinguish between features of the detected stripe patterns and the changes in such stripe patterns. As a result, the controller 160 may match one or more features of the stripe patterns and/or the changes in stripe patterns with features of stripe patterns and/or changes in stripe patterns stored in advance in the memory 150, such that one or more functions and/or processes corresponding to the matched stripe patterns and/or changes in stripe patterns may be performed as a result of the matching.

Figure 7:
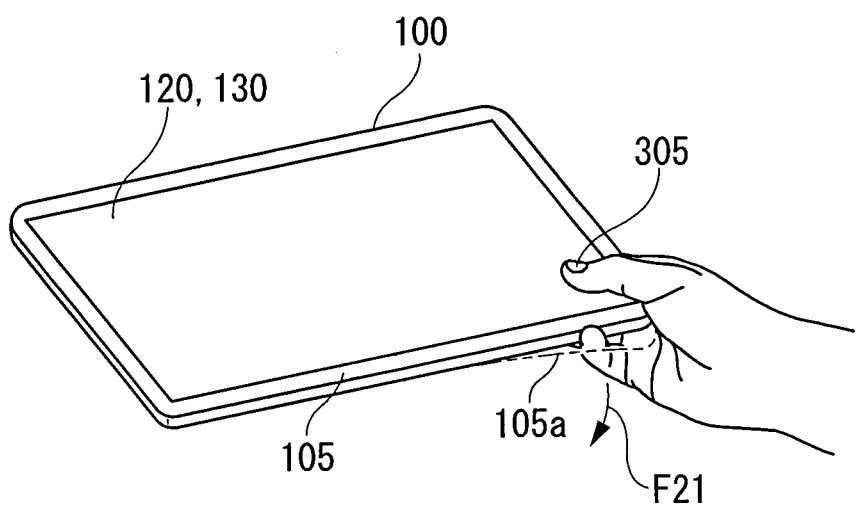
FIG. 7 illustrates another exemplary bending operation performed with one hand according to one aspect of the present disclosure.

Next, FIG. 7 illustrates an exemplary case in which a bending operation is performed with a single hand. Referring to FIG. 7, the mobile device 100 shown in FIG. 7 is illustrated with a user holding the mobile device 100 at a bottom right corner by contacting an operation surface of the touch panel section 130 with his or her thumb 305 while the user's remaining fingers are holding an underside of the mobile device 100. In this example, unlike the foregoing examples in which the user is holding the mobile device 100 with both hands while applying a force, the downward force of the mobile device 100's weight relative to the position at which the user is holding the mobile device 100 causes the controller 160 to detect the bending operation.

As a result of the gravitational bending force in this example, the touch panel section 130 is bent downward with respect to the lower right corner at which the user is holding the mobile device 100. The bending is represented for illustration purposes by the virtual line corresponding to the position of the bent case 105a following the bending operation. As discussed previously, since the case 105 is preferably formed of sufficiently hard materials such as a resin and/or metallic material, the bending of the mobile device 100 in the example of FIG. 7 is typically not visually recognizable; however, even the relatively small bending resultant from the self-weight of the mobile device 100 in FIG. 7 may be detected by the one or more sensors included in the touch panel section 130 such that a sensor output distribution pattern such as a stripe pattern may be generated and detected for use by the controller 160. Additionally, based on features of the detected stripe pattern, the controller 160 may, in certain embodiments, distinguish between bending operations performed with a single hand and bending operations performed with multiple hands. For example, the controller 160 may distinguish between bending operations performed with a single hand and bending operations performed with multiple hands based on a changing state and/or sensor output magnitude, as well as a quantity and/or direction of detected stripe patterns resultant from the bending operation.

Figure 8A:
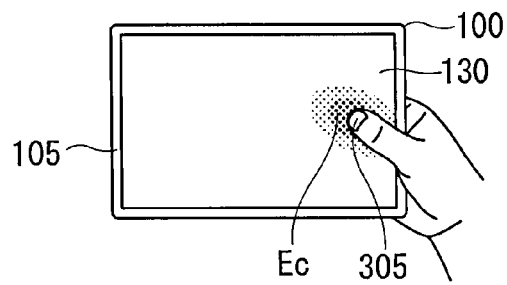
FIG. 8A illustrates an exemplary sensor output distribution pattern for a touch operation performed with one hand according to one aspect of the present disclosure.

Next, FIGS. 8A through 8E illustrate exemplary sensor output distribution patterns resultant from input operations performed on the touch panel section 130 with a single end. In particular, FIG. 8A illustrates a sensor output distribution pattern resultant from a touch operation without a concurrent bending of the touch panel section 130, and FIGS. 8B through 8E illustrate stripe patterns resultant from bending operations performed with a single hand without a simultaneous touch operation.

Referring to FIG. 8A, FIG. 8A illustrates a user's right thumb 305 contacting a right side of the touch panel section 130. As a result of a downward force of the user's thumb 305 on the touch panel section 130 at the location shown in FIG. 8A, a sensor output distribution pattern illustrated as touch pattern Ec in FIG. 8A is generated by the one or more sensors included in the touch panel section 130. Based on the detection of the touch pattern Ec in this example, controller 160 may determine, in certain aspects of the present disclosure, that a touch operation has been performed and a corresponding predetermined process or function may be performed by the controller 160 as a result of detecting the touch operation of FIG. 8A.

Figure 8B:
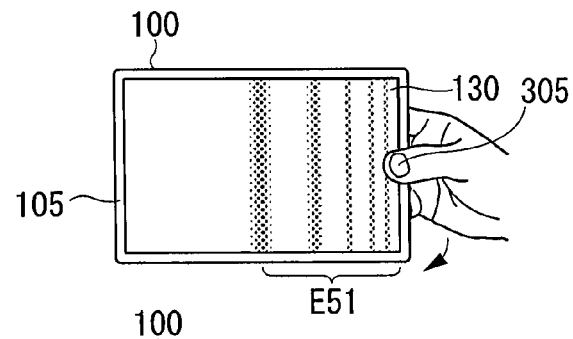
FIGS. 8B-8E illustrate exemplary sensor output stripe patterns for a bending operation performed with one hand according to one aspect of the present disclosure.

Next, FIGS. 8B through 8E illustrate exemplary stripe patterns resultant from a bending operation without a concurrent touch operation. Referring first to FIG. 8B, FIG. 8B illustrates an example in which the user is holding the mobile device 100 at a shorter right edge at a substantially center position of the case 105 while the remaining fingers of the user's hand are contacting an underside of the case 105. As a result of the self-weight of the mobile device 100 in this example, a vertical stripe pattern E51 radiates outward from the right edge of the touch panel section 130. That is, in response to the bending operation, the touch panel section 130 generates the stripe pattern E51 having vertical stripes radiating leftward on the touch panel section 130 from the right end of the screen.

Figure 8C:
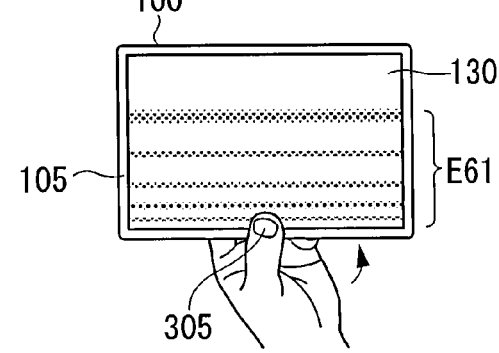

Next, FIG. 8C illustrates an example in which the user is holding a longer lower edge of the mobile device 100 using a single hand. In this example, the user's thumb 305 is holding the case 105 at a substantially center position of the longer lower edge while the user's remaining fingers are contacting an underside of the case 105. As a result of the self-weight of the mobile device 100 as the user is holding the mobile device 100 in this example, a horizontal stripe pattern E61 gradually radiates outward from a lower edge of the touch panel section 130.

Figure 8D:
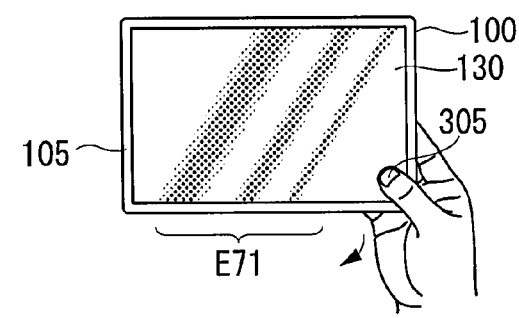

Next, FIG. 8D illustrates an example in which the user is holding a lower right corner of the mobile device 100 with a single hand. In this example, the user's thumb 305 is holding the lower right corner of the case 105 while the user's remaining fingers are holding an underside of the case 105. As a result of the self-weight of the mobile device 100 in this example, a diagonal stripe pattern E71 radiates gradually outward from the position on the touch panel section 130 corresponding to the position of the user's hand. It should be noted that in the example of FIG. 8D, more than one of the user's remaining fingers are contacting the underside of the case 105 such that a relatively large contact surface area is present on the underside of the mobile device 100.

Figure 8E:
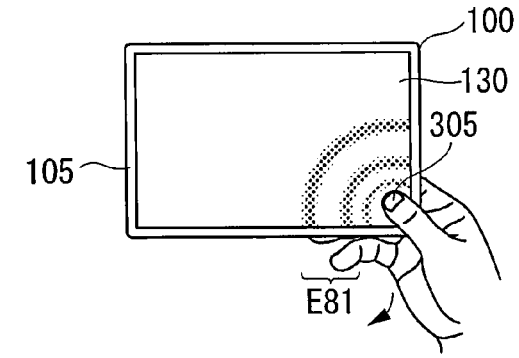

Similar to the example of FIG. 8D, FIG. 8E illustrates a case in which a user is holding the mobile device 100 at a bottom right corner using a single hand. However, in contrast to the example of FIG. 8D, while the user's right thumb 305 is contacting a lower right corner of the touch panel section 130, the surface contact area of the user's remaining finger is on the underside of the mobile device 100, which results in a relatively small contact area compared to the example of FIG. 8D. In this example, the self-weight of the mobile device 100 as the user holds the mobile device 100 with a single hand results in a bending operation that causes a stripe pattern E81 to radiate from the bottom right corner of the touch panel section 130 in a substantially circular shape centering on the bottom right corner of the touch panel section 130.

As shown in the examples of FIG. 8B through FIG. 8E, stripe patterns resultant from bending operations performed on the touch panel section 130 are dependent upon the nature of the bending operation. That is, the features of the stripe patterns will change based on, for example, the location at which the bending operation is performed, the number of hands with which the bending operation is performed, the force applied during the bending operation, the surface contact area of the user's hand during the bending operation, the presence or absence of a touch operation concurrently with the bending operation, the dimensions and weight of the mobile device, the sensitivity of the sensors included in the touch panel section, the changing state of the stripe pattern during the bending operation (e.g., the changing of the spacing interval between stripes, the sensor output magnitude in the respective stripes, the width of the stripes, the direction of the stripes, the shape of the stripes, etc.).

Figure 9A:
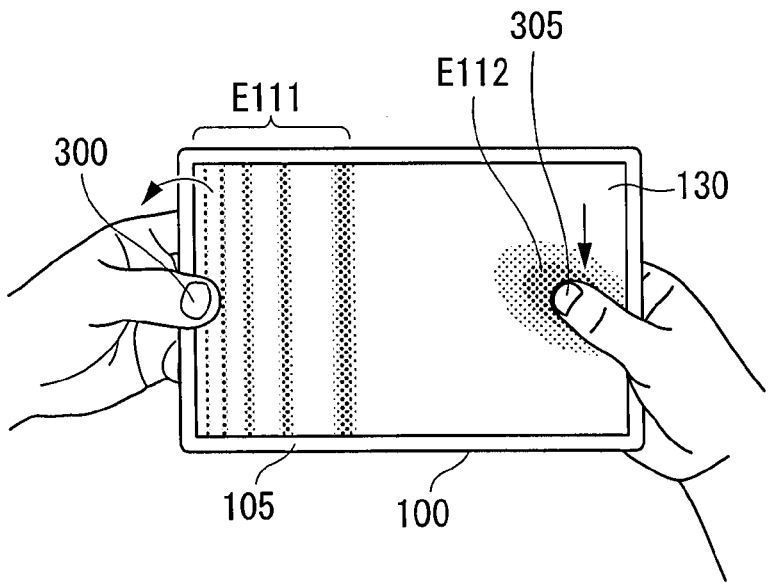
FIGS. 9A and 9B illustrate exemplary sensor output touch and stripe patterns resultant from performing a touch operation and a bending operation concurrently according to one aspect of the present disclosure.
Figure 9B:
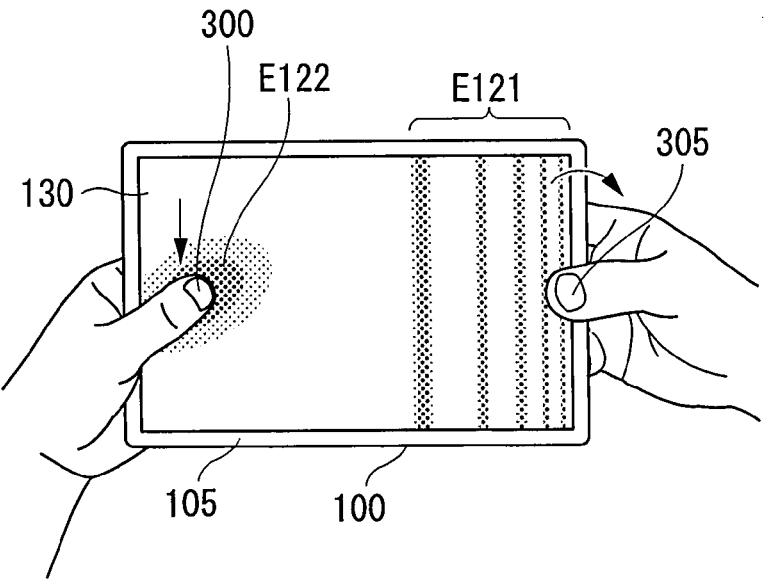

Next, FIGS. 9A and 9B illustrate exemplary sensor output distribution pattern combinations resultant from performing a touch operation and a bending operation simultaneously. Referring first to FIG. 9A, FIG. 9A illustrates an example in which a user's right thumb 305 performs a touch operation at a substantially center region of a right side of the touch panel section 130 while the user's left thumb 300 and remaining fingers of the user's left hand perform a bending operation on the opposing left edge of the mobile device 100. In response to the bending operation performed on the left edge of the mobile device 100 using the user's left hand, the one or more sensors of the touch panel section 130 may, in certain embodiments, generate a sensor output distribution pattern corresponding to stripe pattern E111 illustrated in the example. The stripe pattern E111 illustrated in FIG. 9 includes a plurality of vertical stripes radiating rightward from from the left edge of the touch panel section 130, whereby the spacing interval between the vertical stripes in the stripe pattern E111 is gradually increasing. Further, the stripe pattern E111 may include a change in state corresponding to temporal changes in sensor output magnitude and/or the distribution of the sensor output coordinates (e.g. the thickness of the individual stripes of the stripe pattern and/or the intensity of the stripe pattern coordinate outputs may be proportional to the sensor output magnitude value for the given coordinates).

Regarding the touch operation performed on the right side of the touch panel section 130, the downward force of the user's thumb 305 on the operation surface of the touch panel section 130 results in the sensor output distribution pattern illustrated as circular pattern E112 in the figure. The circular pattern E112 is shown radiating outward from the corresponding position of the user's thumb 305, whereby the sensor output magnitude values resultant from the touch operation gradually decrease with increasing distance from the thumb 305.

FIG. 9B illustrates a corresponding example of a simultaneous touch operation and bending operation whereby the user's right thumb 305 and remaining fingers are performing a bending operation on the right side of the mobile device 100 while the user's left thumb is simultaneously performing a touch operation on a substantially center portion of the left side of the touch panel section 130. Similar to the bending operation performed on the left-hand side of the mobile device 100 in FIG. 9A, the bending operation performed on the right-hand side of the mobile device 100 in FIG. 9B results in the sensors included in the touch panel section 130 generating a sensor output distribution pattern illustrated as stripe pattern E121. The stripe pattern E121 includes a plurality of vertical stripes radiating leftward from the right edge of the touch panel section 130, whereby the spacing interval and the sensor output magnitude of the individual stripes included in the stripe pattern E121 change gradually. In particular, the spacing interval of the stripe pattern E121 increases gradually while the sensor output magnitude values included in the individual stripes of the stripe pattern E121 decrease gradually with increasing distance from the right edge of the touch panel section 130.

Similar to the touch operation performed on the right side of the touch panel section 130 in FIG. 9A, FIG. 9B illustrates the user's left thumb 300 contacting the operation surface of the touch panel section 130 at a substantially center portion of the left side of the touch panel section 130. In response to detecting the touch operation performed by the user's thumb 300, the touch panel section 130 sensors generate a sensor output distribution pattern illustrated as circular pattern E122. The circular pattern E122 radiates outward in a substantially elliptical shape from the position on the touch panel section 130 at which the thumb 300 is performing the touch operation. Additionally, similar to the case for the touch operation of FIG. 9A, the sensor output magnitude values (e.g. the electrostatic capacitance values) decrease gradually with increasing distance from the position of the user's thumb 300.

Next, FIGS. 10A through 10D illustrate additional exemplary sensor output distribution patterns resultant from performing a touch operation and a bending operation concurrently according to one aspect of the present disclosure.

Figure 10A:
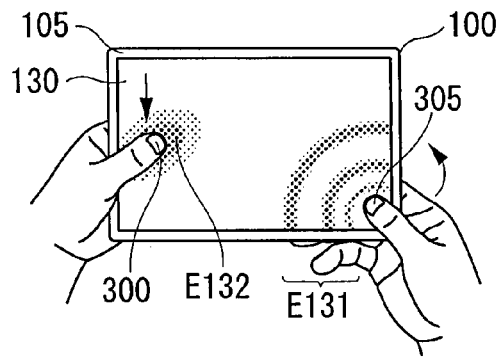
FIGS. 10A-10D illustrate additional exemplary sensor output distribution and stripe patterns resultant from performing a touch operation and a bending operation concurrently according to one aspect of the present disclosure.

Referring first to FIG. 10A, FIG. 10A illustrates an example in which the user is holding the mobile device 100 with both hands while performing a touch operation with the left thumb 300 at a substantially center portion of the left side of the touch panel section 130 while simultaneously performing a bending operation on the bottom right corner of the mobile device 100. In response to the downward force on the touch panel section 130 applied during the touch operation by the user's left thumb 300, the one or more sensors of the touch panel section 130 generate a sensor output distribution pattern corresponding to the touch pattern E132 shown in the figure. The touch pattern E132 illustrated in FIG. 10A is similar to the foregoing examples in which a circular or elliptical shaped sensor output distribution pattern radiates outward from the position at which the user's thumb performs the touch operation.

Similar to the example shown in FIG. 5C, the bending operation performed on the bottom right corner of the mobile device 100 in FIG. 10A results in the sensors of the touch panel section 130 generating the sensor output distribution pattern illustrated as stripe pattern E131 in FIG. 10A. The stripe pattern E131 includes a plurality of rounded stripes radiating outward from the bottom right corner of the touch panel section 130. The spacing interval between stripes included in the stripe pattern E131 gradually increases with increasing distance from the bottom right corner of the touch panel section 130.

In certain aspects of the present disclosure, the controller 160 may detect the combination of sensor output distribution patterns E132 and E131. For example, the controller 160 may register a combination of sensor output distribution patterns based on a detection of distribution patterns within a predetermined time period. The controller 160 may then match one or more features of the detected combination of sensor output distribution patterns E132 and E131 shown in FIG. 10A with one or more features of a predetermined combination of sensor output distribution patterns stored in the memory 150. In response to matching one or more features of the detected and stored combinations of sensor output distribution patterns, the controller 160 may perform a predetermined function or process. For example, in response to detecting the touch operation and bending operation illustrated in FIG. 10A, and the subsequent matching of the resultant sensor output distribution patterns of FIG. 10A with predetermined sensor output distribution patterns stored in the memory 150, the controller 160 may communicate with a television receiver via a communication interface to control the volume of the television receiver. As another example, in response to detecting the combination of the touch operation and bending operation illustrated in FIG. 10A, and the subsequent matching of the resultant sensor output distribution patterns E132 and E131 with a predetermined combination of sensor output distribution patterns stored in the memory 150, the controller 160 may perform direct volume control of the speaker 104 such that the sound output from the speaker 104 is increased.

Figure 10B:
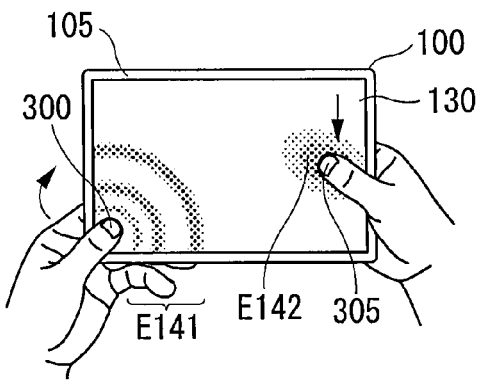

Next, FIG. 10B illustrates a user holding the mobile device 100 with both hands while performing a bending operation on the bottom left corner of the mobile device 100 while simultaneously performing a touch operation at a substantially center portion of the right side of the touch panel section 130. In other words, a simultaneous/concurrent input operation does not necessarily need to begin or end at the same time, nor do the simultaneous/concurrent input operations need to overlap in timing (i.e., a preferably small time interval separation may be used to qualify the events as simultaneous/concurrent).

Referring back to FIG. 10B, in response to detecting the bending operation performed at the bottom left corner of the mobile device 100 in FIG. 10B, the one or more sensors of the touch panel section 130 may generate a sensor output distribution pattern corresponding to the stripe pattern E141 illustrated in the figure. The stripe pattern E141 includes a plurality of rounded stripes radiating outward from the position corresponding to the bottom left corner of the touch panel section 130. Similar to the above examples, in response to detecting the touch operation performed with the user's right thumb 305 in FIG. 10B, the one or more sensors of the touch panel section 130 may generate a sensor output distribution pattern corresponding to the touch pattern E142 shown in the figure.

In response to detecting a combination of sensor output distribution patterns E141 and E142 resultant from the concurrent bending and touch operations, the controller 160 may match the detected combination of sensor output distribution patterns with predetermined combinations of sensor output distribution patterns stored in the memory 150. Based on matching one or more features of the detected and stored combinations of sensor output distribution output patterns, the controller 160 may then perform a predetermined function or process corresponding to the matched combination of sensor output distribution patterns. For example, in response to detecting the combination of simultaneous sensor output distribution patterns shown in FIG. 10B, and the subsequent matching to the predetermined combination of sensor output distribution patterns stored in the memory 150, the controller 160 may control the volume output from the speaker 104 such that the sound output is decreased.

Figure 10C:
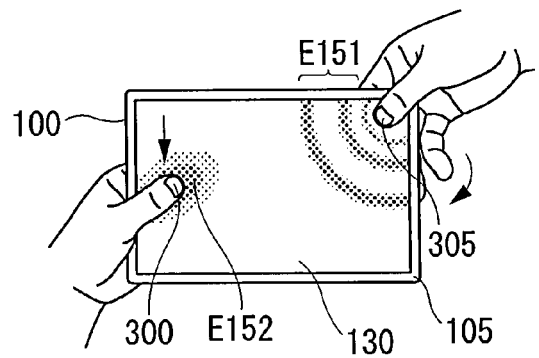

Next, FIG. 10C illustrates an example in which the user performs a touch operation using the left thumb 300 at a substantially center portion of the left side of the touch panel section 130 while simultaneously performing a bending operation on an upper right corner of the mobile device 100. In response to detecting the touch operation, the one or more sensors included in the touch panel section 130 generate a sensor output distribution pattern corresponding to touch pattern E152 shown in the figure. Similarly, in response to detecting the bending operation of the upper right corner of the mobile device 100, the one or more sensors included in the touch panel section 130 generate a sensor output distribution pattern corresponding to the stripe pattern E151. The stripe pattern E151 includes a plurality of rounded stripes radiating outward at increasing spacing intervals from the upper right corner of the touch panel section 130.

In response to detecting the combination of sensor output distribution patterns E151 and E152 of FIG. 10C, the controller 160 may match one or more features of the detected combination of sensor output distribution patterns with one or more features of predetermined combinations of sensor output distribution patterns stored in the memory 150. In response to matching the one or more features of the detected combination of sensor output distribution patterns with the one or more features of the predetermined combination of stored sensor output distribution patterns, the controller 160 may control the mobile device such that a predetermined process or function is performed. For example, in response to detecting the combination of the stripe pattern E151 and the touch pattern E152, and the subsequent matching of one or more features of the combination of the stripe pattern E151 and the touch pattern E152, the controller 160 may output a control signal to an external device such as a television. For example, the controller 160 may output a control signal to the television set that increases the broadcast channel displayed on the television set.

Figure 10D:
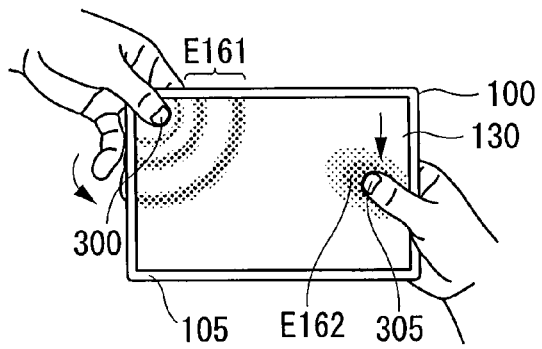

Next, FIG. 10D illustrates an example in which a bending operation is performed in an upper left corner of the mobile device 100 while a touch operation is simultaneously performed at a substantially center position of the right side of the touch panel section 130. In response to the bending operation performed at the upper left corner of the mobile device 100, the one or more sensors of the touch panel section 130 generate a sensor output distribution pattern corresponding to a stripe pattern E161 illustrated in the figure. The stripe pattern E161 includes a plurality of rounded stripes radiating outward from a position corresponding to the upper left corner of the mobile device 100. Similarly, the touch operation performed at the right side of the touch panel section 130 results in a sensor output distribution pattern corresponding to touch pattern E162, which radiates outward from a position corresponding to the position at which the user's thumb 305 contracts the surface of the touch panel section 130. In response to detecting a combination of the stripe pattern E161 and the touch pattern E162, the controller 160 may, in certain embodiments, match one or more features of the detected sensor output distribution patterns with one or more features of predetermined combinations of sensor distribution patterns stored in the memory 150. In response to detecting a match between the one or more features of the detected combination of sensor output distribution patterns and the predetermined combinations of stored sensor output distribution patterns, the controller 160 may perform a predetermined function or process. For example, in response to detecting the simultaneous bending operation and touch operation illustrated in FIG. 10D, and the subsequent matching of the detected and stored combinations of sensor output distribution patterns, the controller 160 may control a communication interface such that a control signal is output to an external device such as a television set, whereby the control signal output to the television set may, for example, decrease the broadcast channel displayed on the television set.

Figure 11:
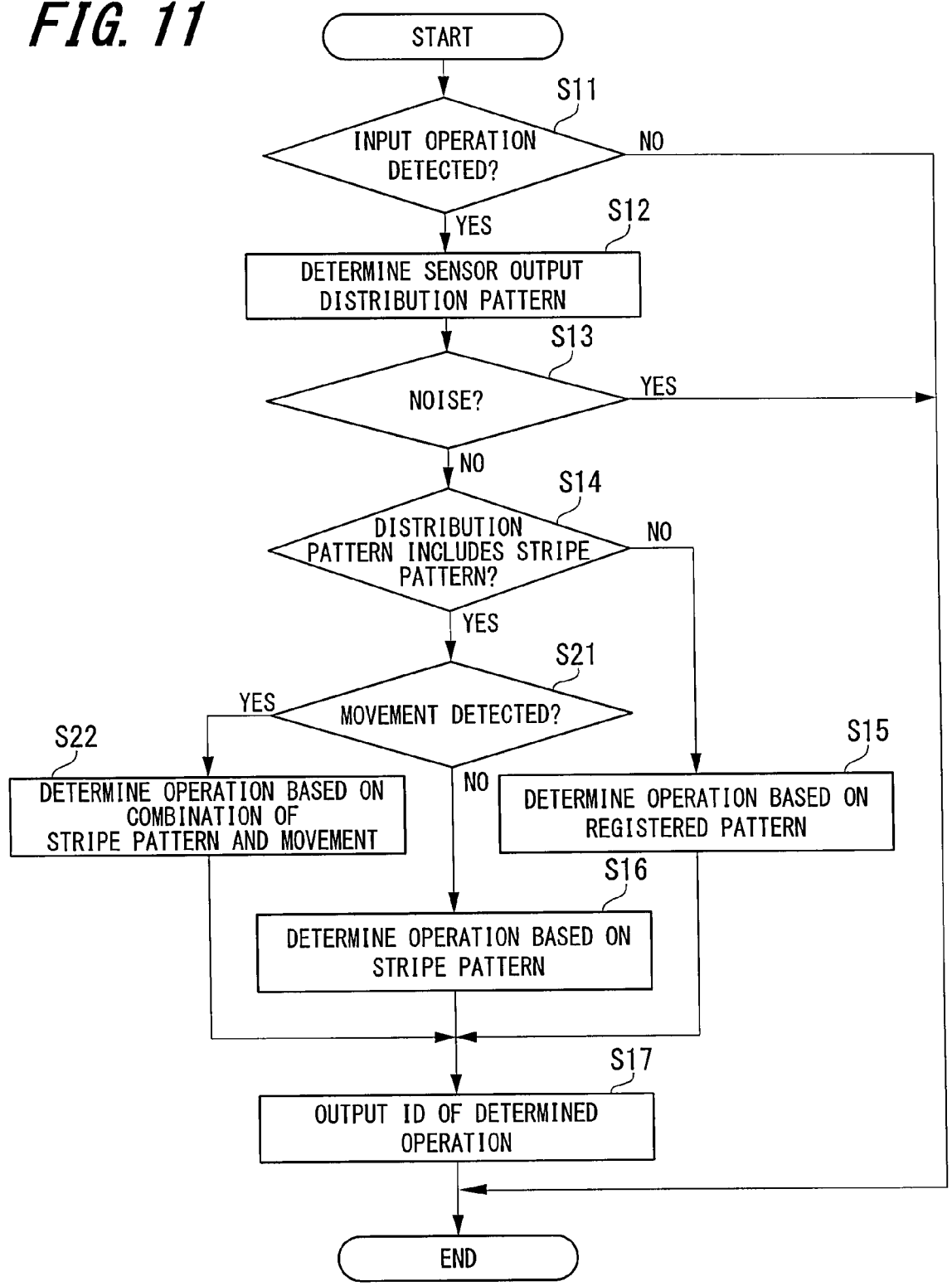
FIG. 11 illustrates an exemplary flowchart for executing a predetermined function or process based on a combination of a motion sensor input and a detection of a bending operation according to one aspect of the present disclosure.

Next, FIG. 11 illustrates an exemplary flowchart for executing a predetermined function or process based on a detected combination of a motion sensor input and a detection of an input operation according to one aspect of the present disclosure. The processing steps S11 to S17 are similar to the processing steps described in FIG. 2 and therefore, further discussion of these processing steps will not be repeated here.

Referring to FIG. 11, in response to determining that a detected sensor output distribution pattern includes a stripe pattern at step S14, the controller 160 at step S21 determines whether a movement of the mobile device 100 is detected. In certain aspects of the present disclosure, the controller 160 determines whether the movement is detected based on a motion signal received from the motion sensor 108. Based on the motion signal, the controller 160 may classify the movement type and/or analyze features of the movement (e.g., direction, speed, distance, duration, etc.). Additionally, the controller 160 may determine whether the movement of the motion device of the mobile device 100 is detected concurrently with the input operation that resulted in the stripe pattern being detected at step S14. Alternatively, the controller 160 may determine whether the movement of the mobile device 100 occurred within a predetermined time period relative to the time at which the input operation occurred.

If a movement of the mobile device 100 is detected at step S21, the controller 160 at step S22 determines, based on one or more features of the stripe pattern and/or one or more features of the movement, whether a combination of the one or more features of the stripe pattern and the one or more features of the movement correspond to a predetermined combination of features of a stripe pattern and movement stored in the memory 150. For example, the controller 160 at step S22 may determine that the mobile device 100 is being shaken upwards and downwards based on the motion sensor 108 motion signal, while at the same time a stripe pattern such as that shown in FIG. 5C is detected, in which case the combination of the movement and the stripe pattern may be compared with predetermined combinations stored in the memory 150. In the case in which a combination of movement and stripe pattern matches one of the predetermined combinations stored in the memory 150, the controller 160 may execute a predetermined process or function.

Processing based on combinations of, for example, movements of the mobile device 100 and a detected sensor output distribution pattern allow for the controller 160 to perform different predetermined functions or processes than would otherwise be performed when the movement and/or the predetermined sensor output distribution pattern is detected individually. For example, when a stripe pattern such as that shown in FIG. 5C is detected in a state in which the motion sensor 108 does not detect a movement of the mobile device 100, the controller 160 may perform an operation which controls the display 120 such that an immediately displayed screen (e.g. web page) is displayed. Alternatively, when the stripe pattern such as that shown in FIG. 5C is detected in a state in which the motion sensor 108 detects a movement of the mobile device 100 and outputs a corresponding motion signal, the controller 160 may perform an operation which controls the display 120 to display a series of pages separated by a predetermined time interval, or to control the display 120 to enable performing a high speed movement of a displayed page.

A skilled artisan will easily appreciate that the functions and processes described in the foregoing examples are merely for illustration purposes, and aspects of the present disclosure may easily be adapted such that other predetermined functions and/or processes may be performed based on features of touch panel input operations.

Moreover, it should also be appreciated that the exemplary sensor output distribution patterns (i.e. stripe patterns and touch patterns) are provided merely for illustration purposes, and actual sensor output distribution patterns will be dependent upon the nature of the input operation performed on the touch panel, as well as the specific technology chosen for the touch panel. However, the skilled artisan will appreciate that the touch panel response to a given input operation (i.e. a bending operation or touch operation) may be determined in advance, and the corresponding sensor output distribution pattern may be stored in advance such that it may be matched to detected sensor output distribution patterns generated during subsequent input operations.

Further, the mobile device 100 discussed in the examples described herein has been illustrated and described in the examples as a tablet type terminal device. However, aspects of the present disclosure may easily be adapted such that they apply to other mobile devices and touch panel terminal devices. For example, aspects of the present disclosure may be adapted such that a digital book reader or a smartphone are controlled based on features of an input operation detected on a touch panel.

Moreover, the device in which aspects of the present disclosure are applied may be adapted such that some or all of a touch panel display is manufactured of a soft raw material. For example, an edge part of a touch panel may be manufactured of a soft raw material such that it is thin and easy to bend. Further, an edge portion or another portion of a protective case of the device may be manufactured of a soft raw material that has material characteristics yielding improved flexibility.

Further still, a groove, etching, or the like may be provided in the device and/or the device's case such that the structure of the device becomes easier to bend. In manufacturing the device with greater flexibility, a sensor output distribution pattern such as a stripe pattern may be more easily detected, which can improve the detection sensitivity of the various sensor output distribution patterns.

Moreover, the direction at which the mobile device 100 illustrated in the foregoing example bends is such that the operation surface of the touch panel display 130 bends upward. However, aspects of the present disclosure may be adapted such that the processing described herein is executed in response other bending directions (e.g., downward, diagonal, twisting, etc.) of the mobile device 100.

Furthermore, when the touch panel section 130 detects an electrostatic capacitance or other such sensor output in response to an input operation, the detection sensitivity at the time of detecting a touch operation and the detection sensitivity at the time of detecting a bending operation may be set to a different sensitivity. That is, a change in electrostatic capacitance and/or an instantaneous electrostatic capacitance value detected in a stripe pattern caused by a bending operation may be bigger or smaller than a corresponding sensor output value detected during a touch operation. For this reason, the sensor output level which distinguishes detections in stripe pattern features may be made well within the determination level of detecting touch operation features.

Obviously, numerous modifications and variations of the present disclosure are possible in light of the above teachings. It is therefore to be understood that within the scope of the appended claims, aspects of the present disclosure may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The above disclosure also encompasses the embodiments noted below.

(1) An apparatus comprising: a touch panel display including one or more sensors for detecting an input operation on the touch panel display, wherein the input operation corresponds to one or more of a bending operation whereby the touch panel display is bent and a touch operation whereby an instruction object contacts a surface of the touch panel display; and circuitry configured to: detect, in response to detecting the bending operation, a presence of a stripe pattern based on sensor values output by the one or more sensors when the bending operation is detected; determine, when the stripe pattern is detected, one or more features of the detected stripe pattern; determine, based on the one or more features of the detected stripe pattern, whether the one or more features of the detected stripe pattern match one or more features of a predetermined pattern stored in a memory; and execute, when the one or more features of the detected stripe pattern match the one or more features of the predetermined pattern, a predetermined function or process corresponding to the predetermined pattern.

(2) The apparatus of (1), wherein the predetermined pattern stored in the memory includes information relating to at least one of a position of the detected stripe pattern on the touch panel display and a changing state of the detected stripe pattern.

(3) The apparatus of (1) or (2), wherein: the circuitry determines the one or more features of the detected stripe pattern based on a position of the detected stripe pattern on the touch panel display, and the circuitry executes the predetermined function or process when the position of the detected stripe pattern matches position information corresponding to the predetermined pattern stored in the memory.

(4) The apparatus of any one of (1) to (3), wherein: the circuitry determines the one or more features of the detected stripe pattern based on a changing state of the detected stripe pattern, and the circuitry executes the predetermined function or process when the changing state of the detected stripe pattern matches changing state information corresponding to the predetermined pattern stored in the memory.

(5) The apparatus of any one of (1) to (4), wherein the changing state includes a spacing interval between stripes included in the detected stripe pattern.

(6) The apparatus of any one of (1) to (5), wherein: the one or more sensors output a magnitude value in response to detecting an input operation, wherein the magnitude value corresponds to a force of the input operation, and the changing state includes a relative change in the magnitude values corresponding to stripes included in the detected stripe pattern.

(7) The apparatus of any one of (1) to (6), wherein the predetermined function or process corresponds to generating a control signal and outputting the control signal to an external device via a communication interface.

(8) The apparatus of any one of (1) to (7), wherein when the circuitry detects a plurality of stripe patterns radiating from multiple locations on the touch panel display, the circuitry determines that the bending operation is performed with respect to the multiple locations of the touch panel display.

(9) The apparatus of any one of (1) to (8), wherein when the circuitry detects the touch operation and the bending operation concurrently, the circuitry determines one or more features of the touch operation and determines, based on a combination of the one or more detected stripe pattern features and the one or more features of the touch operation, whether the combination matches one or more features of a predetermined combination stored in the memory.

(10) The apparatus of any one of (1) to (9), further comprising a motion sensor that outputs a motion signal to the circuitry in response to detecting a movement of the apparatus, wherein when the circuitry detects the stripe pattern and the movement concurrently, the circuitry determines one or more features of movement and determines, based on a combination of the one or more detected stripe pattern features and the one or more features of the movement, whether the combination matches a predetermined combination stored in the memory.

(11) A method of controlling an apparatus that includes a touch panel display having one or more sensors for detecting an input operation on the touch panel display, the input operation corresponding to one or more of a bending operation whereby the touch panel display is bent and a touch operation whereby an instruction object contacts a surface of the touch panel display, the method comprising: detecting, by circuitry in response to detecting the bending operation, a presence of a stripe pattern based on sensor values output by the one or more sensors when the bending operation is detected; determine, by the circuitry when the stripe pattern is detected, one or more features of the stripe pattern; determining, by the circuitry based on the one or more features of the stripe pattern, whether the one or more features of the detected stripe pattern match one or more features of a predetermined pattern stored in a memory; and executing, by the circuitry when the one or more features of the detected stripe pattern match the one or more features of the predetermined pattern, a predetermined function or process corresponding to the predetermined pattern.

(12) The method of (11), wherein the predetermined pattern stored in the memory includes information relating to at least one of a position of the stripe pattern on the touch panel display and a changing state of the stripe pattern.

(13) The method of (11) or (12), wherein: the circuitry determines the one or more features of the detected stripe pattern based on a position of the detected stripe pattern on the touch panel display, and the circuitry executes the predetermined function or process when the position of the detected stripe pattern matches position information corresponding to the predetermined pattern stored in the memory.

(14) The method of any one of (11) to (13), wherein: the circuitry determines the one or more features of the detected stripe pattern based on a changing state of the detected stripe pattern, and the circuitry executes the predetermined function or process when the changing state of the detected stripe pattern matches changing state information corresponding to the predetermined pattern stored in the memory.

(15) The method of any one of (11) to (14), wherein the changing state includes a spacing interval between stripes included in the detected stripe pattern.

(16) The method of any one of (11) to (15), wherein: the one or more sensors output a magnitude value in response to detecting an input operation, wherein the magnitude value corresponds to a force of the input operation, and the changing state includes a relative change in the magnitude values corresponding to stripes included in the detected stripe pattern.

(17) The method of any one of (11) to (16), wherein the predetermined function or process corresponds to generating a control signal and outputting the control signal to an external device via a communication interface.

(18) The method of any one of (11) to (17), wherein when the circuitry detects a plurality of stripe patterns radiating from multiple locations on the touch panel display, the circuitry determines that the bending operation is performed with respect to the multiple locations of the touch panel display.

(19) The method of any one of (11) to (18), wherein when the circuitry detects the touch operation and the bending operation concurrently, the circuitry determines one or more features of the touch operation and determines, based on a combination of the one or more stripe pattern features and the one or more features of the touch operation, whether the combination matches a predetermined combination stored in the memory.

(20) The method of any one of (11) to (19), wherein: the apparatus includes a motion sensor that outputs a motion signal to the circuitry in response to detecting a movement of the apparatus, and when the circuitry detects the stripe pattern and the movement concurrently, the circuitry determines one or more features of movement and determines, based on a combination of the one or more detected stripe pattern features and the one or more features of the movement, whether the combination matches a predetermined combination stored in the memory.

(21) A non-transitory computer readable medium having instructions stored therein that when executed by one or more processors, cause the one or more processors to perform a control method comprising: detecting, based on an input from one or more sensors included on a touch panel display, an input operation performed on the touch panel display, wherein the input operation corresponds to one or more of a bending operation whereby the touch panel display is bent and a touch operation whereby an instruction object contacts a surface of the touch panel display; detecting, in response to detecting the bending operation, a presence of a stripe pattern based on sensor values output by the one or more sensors when the bending operation is detected; determining, when the stripe pattern is detected, one or more features of the detected stripe pattern; determining, based on the one or more features of the detected stripe pattern, whether the one or more features of the detected stripe pattern match one or more features of a predetermined pattern stored in a memory; and executing, when the one or more features of the detected stripe pattern match the one or more features of the predetermined pattern, a predetermined function or process corresponding to the predetermined pattern.

The invention claimed is:

1. An apparatus comprising:
   a touch panel display including one or more sensors to detect an input operation on the touch panel display, wherein the input operation corresponds to a combination of one or more of a bending operation whereby the touch panel display is bent so as to generate a substantially parallel stripe pattern and a touch operation whereby an instruction object contacts a surface of the touch panel display so as to generate a substantially rounded stripe pattern, the substantially parallel stripe pattern and the substantially rounded stripe pattern formed at spaced apart locations on the touch panel display;
   circuitry configured to:
      detect, in response to detecting the bending operation, a presence of the stripe pattern based on sensor values output by the one or more sensors when the bending operation is detected;
      determine, when the stripe pattern is detected, one or more features of the detected stripe pattern;
      determine, based on the one or more features of the detected stripe pattern, whether the one or more features of the detected stripe pattern match one or more features of a predetermined pattern stored in a memory; and
      execute, when the one or more features of the detected stripe pattern match the one or more features of the predetermined pattern, a predetermined function or process corresponding to the predetermined pattern; and
   a motion sensor that outputs a motion signal to the circuitry in response to detecting a movement of the apparatus,
   wherein when the circuitry detects the touch operation and the bending operation concurrently, the circuitry determines one or more features of the touch operation and determines, based on a combination of the one or more detected stripe pattern features and the one or more features of the touch operation, whether the combination matches one or more features of a predetermined combination stored in the memory, and
   when the circuitry detects the stripe pattern and the movement concurrently, the circuitry determines one or more features of the movement and determines, based on a combination of the one or more detected stripe pattern features and the one or more features of the movement, whether the combination matches a predetermined combination stored in the memory.

2. The apparatus of claim 1, wherein
the predetermined pattern stored in the memory includes information relating to at least one of a position of the detected stripe pattern on the touch panel display and a changing state of the detected stripe pattern.

3. The apparatus of claim 1, wherein
the circuitry determines the one or more features of the detected stripe pattern based on a position of the detected stripe pattern on the touch panel display, and
the circuitry executes the predetermined function or process when the position of the detected stripe pattern matches position information corresponding to the predetermined pattern stored in the memory.

4. The apparatus of claim 1, wherein
the circuitry determines the one or more features of the detected stripe pattern based on a changing state of the detected stripe pattern, and
the circuitry executes the predetermined function or process when the changing state of the detected stripe pattern matches changing state information corresponding to the predetermined pattern stored in the memory.

5. The apparatus of claim 4, wherein
the changing state includes a spacing interval between stripes included in the detected stripe pattern.

6. The apparatus of claim 4, wherein
the one or more sensors output a magnitude value in response to detecting an input operation, wherein the magnitude value corresponds to a force of the input operation, and
the changing state includes a relative change in the magnitude values corresponding to stripes included in the detected stripe pattern.

7. The apparatus of claim 1, wherein
the predetermined function or process corresponds to generating a control signal and outputting the control signal to an external device via a communication interface.

8. The apparatus of claim 1, wherein
when the circuitry detects a plurality of stripe patterns radiating from multiple locations on the touch panel display, the circuitry determines that the bending operation is performed with respect to the multiple locations of the touch panel display.

9. A method of controlling an apparatus that includes a touch panel display having one or more sensors to detect an input operation on the touch panel display, the input operation corresponding to a combination of one or more of a bending operation whereby the touch panel display is bent so as to generate a substantially parallel stripe pattern and a touch operation whereby an instruction object contacts a surface of the touch panel display so as to generate a substantially rounded stripe pattern, the substantially parallel stripe pattern and the substantially rounded stripe pattern formed at spaced apart locations on the touch panel display, the method comprising:

- detecting, by circuitry in response to detecting the bending operation, a presence of the stripe pattern based on sensor values output by the one or more sensors when the bending operation is detected;
- determining, by the circuitry when the stripe pattern is detected, one or more features of the stripe pattern;
- determining, by the circuitry based on the one or more features of the stripe pattern, whether the one or more features of the detected stripe pattern match one or more features of a predetermined pattern stored in a memory; and
- executing, by the circuitry when the one or more features of the detected stripe pattern match the one or more features of the predetermined pattern, a predetermined function or process corresponding to the predetermined pattern,
- wherein when the circuitry detects the touch operation and the bending operation concurrently, the circuitry determines one or more features of the touch operation and determines, based on a combination of the one or more detected stripe pattern features and the one or more features of the touch operation, whether the combination matches a predetermined combination stored in the memory,
- wherein the apparatus includes a motion sensor that outputs a motion signal to the circuitry in response to detecting a movement of the apparatus, and
- when the circuitry detects the stripe pattern and the movement concurrently, the circuitry determines one or more features of the movement and determines, based on a combination of the one or more detected stripe pattern features and the one or more features of the movement, whether the combination matches a predetermined combination stored in the memory.

10. The method of claim 9, wherein
the predetermined pattern stored in the memory includes information relating to at least one of a position of the stripe pattern on the touch panel display and a changing state of the stripe pattern.

11. The method of claim 9, wherein
the circuitry determines the one or more features of the detected stripe pattern based on a position of the detected stripe pattern on the touch panel display, and
the circuitry executes the predetermined function or process when the position of the detected stripe pattern matches position information corresponding to the predetermined pattern stored in the memory.

12. The method of claim 9, wherein
the circuitry determines the one or more features of the detected stripe pattern based on a changing state of the detected stripe pattern, and
the circuitry executes the predetermined function or process when the changing state of the detected stripe pattern matches changing state information corresponding to the predetermined pattern stored in the memory.

13. The method of claim 12, wherein
the changing state includes a spacing interval between stripes included in the detected stripe pattern.

14. The method of claim 12, wherein
the one or more sensors output a magnitude value in response to detecting an input operation, wherein the magnitude value corresponds to a force of the input operation, and
the changing state includes a relative change in the magnitude values corresponding to stripes included in the detected stripe pattern.

15. The method of claim 9, wherein
the predetermined function or process corresponds to generating a control signal and outputting the control signal to an external device via a communication interface.

16. The method of claim 9, wherein
when the circuitry detects a plurality of stripe patterns radiating from multiple locations on the touch panel display, the circuitry determines that the bending operation is performed with respect to the multiple locations of the touch panel display.

17. The apparatus of claim 1, wherein the motion sensor includes an accelerometer that outputs the motion signal to the circuitry in response to detecting the movement of the apparatus.

18. The apparatus of claim 1, wherein the motion sensor includes a geomagnetic sensor that outputs the motion signal to the circuitry in response to detecting the movement of the apparatus.

19. The apparatus of claim 1, wherein the motion sensor includes a gyroscope that outputs the motion signal to the circuitry in response to detecting the movement of the apparatus.

20. The apparatus of claim 1, wherein the motion signal is generated by shaking the apparatus upwards and downwards.

* * * * *